(12) United States Patent
Masudaya (10) Patent No.: US 7,387,020 B2
(45) Date of Patent: Jun. 17, 2008

(54) TIRE INFORMATION DETECTING SYSTEM

(75) Inventor: Hideki Masudaya, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 11/693,325

(22) Filed: Mar. 29, 2007

(65) Prior Publication Data

US 2007/0229241 A1 Oct. 4, 2007

(30) Foreign Application Priority Data

Mar. 31, 2006 (JP) ............................. 2006-097770

(51) Int. Cl.
*B60C 23/02* (2006.01)
*B60C 23/00* (2006.01)

(52) U.S. Cl. ................ 73/146.5; 340/447; 340/539.22; 29/592.1

(58) Field of Classification Search ................ 73/146, 73/146.5; 340/447, 442, 445, 539.22; 29/592.1
See application file for complete search history.

(56) References Cited

U.S. PATENT DOCUMENTS

| 4,174,515 | A | * | 11/1979 | Marzolf ...................... 340/447 |
| 4,569,111 | A | * | 2/1986 | Mutou ........................ 29/283.5 |
| 5,728,933 | A | * | 3/1998 | Schultz et al. ............. 73/146.5 |
| 6,378,360 | B1 | | 4/2002 | Bartels |
| 6,897,775 | B2 | * | 5/2005 | Elsner et al. .......... 340/539.22 |

* cited by examiner

*Primary Examiner*—Andre J Allen
(74) *Attorney, Agent, or Firm*—Brinks Hofer Gilson & Lione (57) ABSTRACT

A transponder is provided. The transponder includes an antenna, a modulation/demodulation unit (diode) that modulates and demodulates signals received and transmitted from and to a controller, a pressure resonator including a first piezoelectric single-crystal resonating element and a pressure sensor, and a reference resonator including a second piezoelectric single-crystal resonating element and a capacitor. The controller transmits a signal for resonating the pressure resonator and the reference resonator, receives a signal having the resonance frequency of the pressure resonator and a signal having the resonance frequency of the reference resonator, and computes a measured value in accordance with the resonance frequencies of the two resonators retrieved from the received signals.

15 Claims, 5 Drawing Sheets

TIRE INFORMATION DETECTING SYSTEM

This patent document claims the benefit of Japanese Patent Application No. 2006-097770 filed Mar. 31, 2006, which is hereby incorporated by reference.

BACKGROUND

1. Field

The present embodiments generally relate to a tire information detecting system and, in particular, to a tire information detecting system used for motor vehicles to detect tire information, such as a tire pressure.

2. Related Art

Wireless transmission systems have been developed that wirelessly transmit a measured value, such as tire pressure of a motor vehicle or the like, to a controller disposed on the body of the motor vehicle in order to evaluate that value for outputting a warning message to a driver (refer to, for example, Japanese Patent No. 3494440 and, in particular, FIGS. 3 and 5). Such wireless transmission systems include a controller, as shown in FIG. 6, disposed on the body of a motor vehicle and a measured value transmitter (transponder), as shown in FIG. 7, disposed in a tire.

Figure 6:
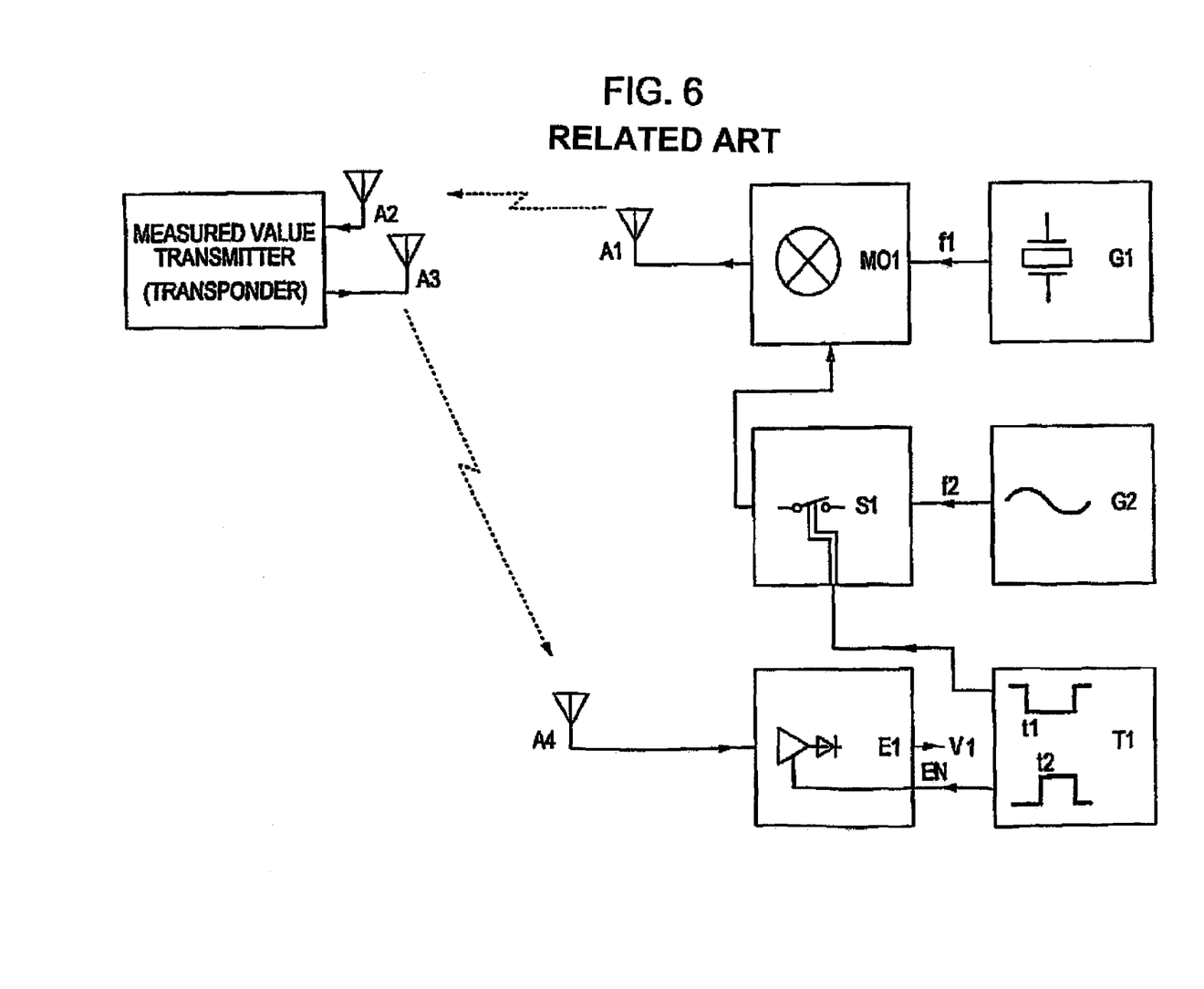
FIG. 6 is a schematic illustration of a circuit diagram of a controller of a known tire information detecting system.

As shown in FIG. 6, the controller includes a carrier wave oscillator G1 for generating carrier waves f1 having a frequency of about 2.4 GHz, a modulator MO1, and an oscillator G2 for outputting an oscillation signal for modulation. The oscillator G2 outputs, to the modulator MO1, an oscillation signal having a frequency f2 that is close to the resonance frequency of a resonator of a transponder, which is described below. The carrier waves output from the carrier wave oscillator G1 are amplitude-modulated by the oscillation signal output from the oscillator G2. Subsequently, the amplitude-modulated 2.4-GHz high-frequency signal is amplified by an amplifier (not shown) and is emitted from an antenna A1 disposed in the vicinity of the tire.

The controller further includes a switch S1, a receiver E1, and a timer T1. The switch S1 is used for selecting whether or not the amplitude modulation is performed by the modulator MO1. The receiver E1 receives a high-frequency signal emitted from the transponder and computes a measured value (S1), such as a tire pressure. The timer T1 controls the switching timing of the switch S1 and the state of the receiver E1. After the timer T1 sets the carrier waves to be amplitude-modulated so that an amplitude-modulated high-frequency signal is transmitted for a predetermined time period, the amplitude modulation is stopped at a time t1. Thereafter, unmodulated carrier waves are transmitted. The receiver E1 becomes active at a time t2 which is within about 1 μs from the time t1 so as to receive the high-frequency signal output from the transponder via an antenna A4.

Figure 7:
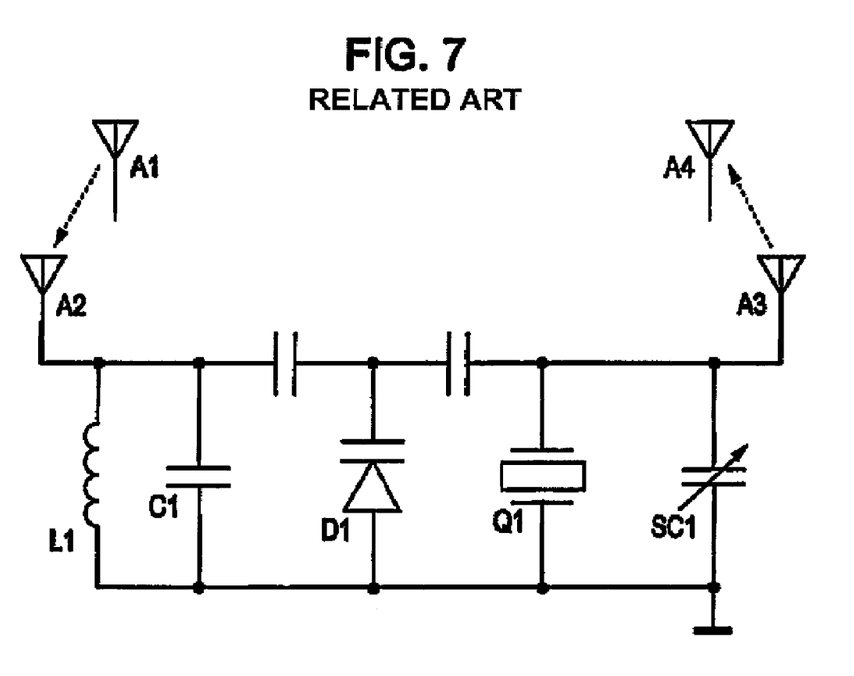
FIG. 7 is a schematic illustration of a circuit diagram of a transponder of a known tire information detecting system.

As shown in FIG. 7, the transponder includes a low-pass filter L1/C1, a diode D1 serving as a modem, and a capacitive pressure sensor (hereinafter simply referred to as a "pressure sensor") SC1 whose capacitance varies in accordance with a tire pressure, and a resonator including a quartz crystal resonating element Q1 that is excited by a frequency component included in the high-frequency signal output from the controller. The 2.4-GHz carrier waves are removed from the high-frequency signal output from the controller by the low-pass filter L1/C1.

The high-frequency signal is demodulated by the diode D1. A signal having a frequency that is the same as that of the oscillation signal from the oscillator G2 is retrieved. Since the resonator has a resonance frequency close to the frequency of the oscillation signal from the oscillator G2, the resonator is excited by the signal generated here. This excitation generates a signal having the resonance frequency. Note that since the resonance frequency of the resonator varies as the capacitance of the pressure sensor SC1 varies in accordance with the tire pressure, the signal of the resonance frequency generated here is effected by the variation.

The controller transmits the amplitude-modulated high-frequency signal and, subsequently, the controller stops the amplitude modulation so as to continuously transmit unmodulated carrier waves. After the amplitude modulation is stopped, the resonator still oscillates for at least about 1 ms. The unmodulated carrier waves output from the controller are amplitude-modulated by the diode D1 in accordance with a signal having the resonance frequency of the resonator and are emitted from an antenna A3. The receiver E1 receives the amplitude-modulated high-frequency signal via the antenna A4 and retrieves the signal having the resonance frequency using, for example, a modem (not shown). In this way, the controller can compute the measured value (V1), such as a tire pressure.

In the wireless transmission system described in Japanese Patent No. 3494440, the transponder can include a reference resonator including a quartz crystal resonating element resonator and additional resonators. Thus, the transponder transmits measured values, such as the tire temperature and the structural stress of the tire, so that the controller can compute these measured values.

However, in the above-described wireless transmission systems, the resonance frequency of the resonator in the transponder is effected by the desired tire information such as a tire pressure and also another factor such as temperature. Thus, an error occurs in the measured value due to a change in temperature in the tire, and therefore, an accurate measured value cannot be detected.

In addition, even when the transponder further includes a reference resonator to compute the measured value of a tire pressure, an error in the measured value still occurs because the temperature characteristics and the secular change characteristics of the quartz crystal resonating elements of the resonators are different. Accordingly, an accurate measured value cannot be detected.

SUMMARY

The present embodiments may obviate one or more of the drawbacks or limitations inherent in the related art. For example, in one embodiment, a tire information detecting system reduces the effects of the factors other than the desired tire information and accurately detects the desired tire information, such as a tire pressure.

In one embodiment, a tire information detecting system includes a measured value transmitter disposed in a tire of a vehicle and a controller disposed in the body of the vehicle. The measured value transmitter includes an antenna, a modulating/demodulating unit that is connected to the antenna and that modulates and demodulates signals received and transmitted from and to the controller. First and second coupling capacitors are connected to the antenna. A first resonator is connected to the first coupling capacitor and includes a first piezoelectric single-crystal resonating element and a pressure sensor. A second resonator is connected to the second coupling capacitor and includes a second piezoelectric single-crystal resonating element and a capacitor. The controller transmits a signal for resonating the first and second resonators, receives a signal having the resonance frequency of the first resonator and a signal having the resonance frequency of the second resonator, and computes a measured value in accordance with the resonance frequencies of the first and second resonators retrieved from the received signals.

The measured value transmitter includes the first resonator whose resonance frequency varies in accordance with a tire pressure and the second resonator whose resonance frequency is minimally affected by a change in the tire pressure. The controller computes a measured value in accordance with the resonance frequencies retrieved from the signals of the resonance frequencies of the first and second resonators. Even when the temperature of the tire changes, the measured value can be computed using the resonance frequencies effected by the temperature change, and therefore, the measured value can be computed with a more little error caused by a factor such as the temperature of the tire. Consequently, the measured value, such as a tire pressure, can be accurately detected.

In one embodiment, the characteristics of the first piezoelectric single-crystal resonating element closely resemble the characteristics of the second piezoelectric single-crystal resonating element. In such a case, even when the temperature of the tire changes, that effect is equally applied to the resonance frequencies of the two resonators. Accordingly, by computing the measured value in accordance with the resonance frequencies of the first and second resonators, the measured value, such as a tire pressure, can be accurately detected without the affect of factors such as the temperature of the tire.

In one embodiment, the first piezoelectric single-crystal resonating element is a first quartz crystal resonating element and the second piezoelectric single-crystal resonating element is a second quartz crystal resonating element. Since the quartz crystal resonating element has a high Q and a response frequency is stable, a reliable measured value can be provided compared with other types of piezoelectric single-crystal resonating elements.

In one embodiment, quartz pieces used for the first quartz crystal resonating element and the second quartz crystal resonating element are manufactured from a single wafer. By manufacturing the quartz pieces used for the quartz crystal resonating elements from a single wafer, the characteristics of the quartz piece of the first resonator can closely resemble the characteristics of the quartz piece of the second resonator.

In one embodiment, the measured value transmitter further includes a third resonator including a third piezoelectric single-crystal resonating element and a capacitor, where the resonance frequency of the third resonator changes in accordance with a change in temperature of the tire. The characteristics of the first piezoelectric single-crystal resonating element closely resemble the characteristics of the second piezoelectric single-crystal resonating element, and the characteristics of the third piezoelectric single-crystal resonating element are different from the characteristics of the first piezoelectric single-crystal resonating element and the second piezoelectric single-crystal resonating element. By determining the resonance frequencies of the first and second resonators having the characteristics that closely resemble each other, the measured value, such as a tire pressure, can be accurately detected. By determining the resonance frequency of the third resonator including a piezoelectric single-crystal resonating element having the characteristics that are different from those of the first piezoelectric single-crystal resonating element and the second piezoelectric single-crystal resonating element, the temperature of the tire can be accurately detected.

In at least one embodiment, tire information, such as a tire pressure, can be detected while reducing the effects of the factors other than the desired tire information. In addition, another type of tire information, such as a temperature, can be accurately detected.

DETAILED DESCRIPTION

In one embodiment, a tire information detecting system (wireless transmission system) includes a controller disposed on the body of a vehicle and a measured value transmitter (hereinafter referred to as a "transponder") disposed in a tire.

The configuration of the transponder of the tire information detecting system according to the present embodiment is different from that of the known tire information detecting system. Therefore, hereinafter, the circuit configuration of the transponder of the tire information detecting system according to the present embodiment is described in detail. The difference between the configurations of the controllers is described with reference to components shown in FIG. 6 as needed.

Figure 1:
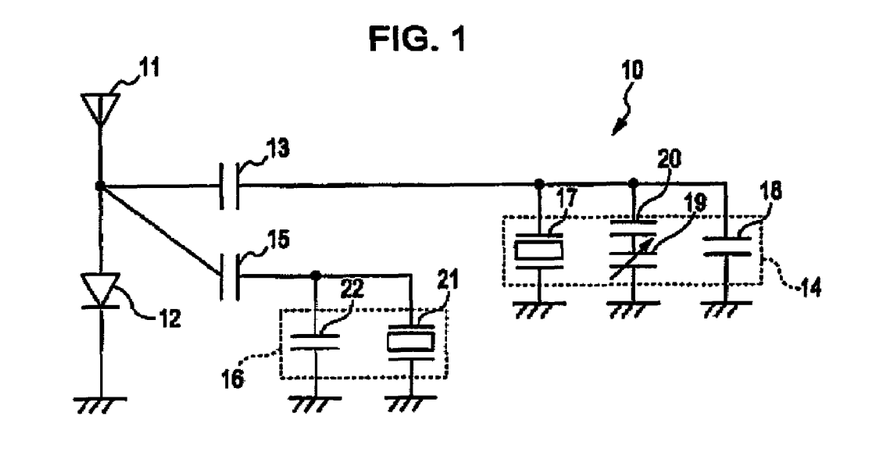
FIG. 1 illustrates an exemplary circuit configuration of a transponder of a tire information detecting system according to one embodiment.

FIG. 1 illustrates an exemplary circuit configuration of the transponder of the tire information detecting system according to the present embodiment. Note that the circuit configuration shown in FIG. 1 is a simplified one for describing the present invention. A low-pass filter L1/C1 included in the known transponder (see FIG. 7) is not shown. In FIG. 1, the low-pass filter is to be connected between an antenna 11, which is described below, and a pair of coupling capacitors 13 and 15.

According to the present embodiment, as shown in FIG. 1, a transponder 10 includes the transmission/reception antenna 11. A modulating/demodulating diode 12 is connected to the antenna 11 in series. Additionally, a pressure resonator 14 is connected to the antenna 11 via the coupling capacitor 13. A reference resonator 16 is connected to the antenna 11 via the coupling capacitor 15.

The pressure resonator 14 and a reference resonator 16 are composed of a resonator including a quartz crystal resonating element. The pressure resonator 14 serves as a first resonator whereas the reference resonator 16 serves as a second resonator.

The pressure resonator 14 includes a quartz crystal resonating element 17 for measuring a pressure, a capacitor 18 for forming the load capacitance for determining the resonance frequency of the pressure resonator 14, and a capacitive pressure sensor (hereinafter simply referred to as a "pressure sensor") 19.

The pressure sensor 19 is connected to the quartz crystal resonating element 17a via an adjustment capacitor 20 so as to prevent the variation in detected values. The pressure resonator 14 has a resonance frequency of, for example, 9.800 MHz. This resonance frequency of the pressure resonator 14 varies in accordance with the tire pressure detected by the pressure sensor 19.

The reference resonator 16 includes a quartz crystal resonating element 21 for providing a reference value for measuring a pressure and a capacitor 22 for forming the load capacitance for determining the resonance frequency of the reference resonator 16. The reference resonator 16 has a resonance frequency of, for example, 9.803 MHz.

The pressure resonator 14 is connected to the antenna 11 via the coupling capacitor 13. The reference resonator 16 is connected to the antenna 11 via the coupling capacitor 15. Accordingly, the effect of one of the pressure resonator 14 and the reference resonator 16 on the other is reduced to a level at which the measurement can be performed without any problems. Therefore, the resonance frequency of the reference resonator 16 is not affected by the pressure detected by the pressure sensor 19. The resonance frequency of the pressure resonator 14 is affected by the capacitance of the pressure sensor 19 that changes in accordance with the air pressure of a tire to be measured and an environmental change in the tire (e.g., a temperature change in the tire). By disposing the reference resonator 16 having no pressure sensor 19 and measuring the resonance frequency of the reference resonator 16, only the effect of the environmental change can be measured. Thus, the pressure sensor 19 can measure the tire pressure without the effect of the environmental change from the resonance frequencies of the two resonators. The self-resonance frequency of the quartz crystal resonating element 17 for measuring a pressure is substantially the same as that of the quartz crystal resonating element 21 for providing the reference value.

In the controller of the tire information detecting system according to the present embodiment, the oscillator G2 generates an oscillation signal having a frequency f2 that is close to the resonance frequency of the reference resonator 16 and an oscillation signal having a frequency f3 that is close to the resonance frequency of the pressure resonator 14. An oscillation signal having a center frequency of 9.803 MHz and an oscillation signal having a center frequency of 9.800 MHz are generated. The carrier waves f1 are amplitude-modulated by these oscillation signals. Like the known controller, the switch S1 selects whether the amplitude modulation is performed or not.

According to the present embodiment, amplitude modification is performed by the oscillation signal having a center frequency of f2 (the oscillation signal having a center frequency of 9.803 MHz) and, subsequently, the amplitude modification is stopped. Thereafter, amplitude modification is performed by the oscillation signal having a center frequency of f3 (the oscillation signal having a center frequency of 9.800 MHz) and, subsequently, the amplitude modification is stopped. Even when the amplitude modification by the first oscillation signal having a center frequency of f2 is stopped, the reference resonator 16 continues to oscillate for about 1 ms or more, like the known transponder. Accordingly, unmodulated carrier waves f1 are amplitude-modified by a signal having the resonance frequency of the reference resonator 16 via the diode 12 and then are emitted from the antenna 11.

Even when the amplitude modification by the second oscillation signal having a center frequency of f3 is stopped, the pressure resonator 14 continues to oscillate for about 1 ms or more. Accordingly, unmodulated carrier waves f1 are amplitude-modified by a signal of the resonance frequency of the reference resonator 16 via the diode 12 and then are emitted from the antenna 11.

Since the reference resonator 16 and the pressure resonator 14 are disposed in the same tire, these resonance frequencies are affected by a factor, such as a temperature of the tire, in the same manner. The resonance frequency of the pressure resonator 14 is affected by a change in the pressure detected by the pressure sensor 19. The resonance frequency of the reference resonator 16 is not affected by the change in the pressure detected by the pressure sensor 19.

The controller receives the high-frequency signal amplitude-modified by the signal having the resonance frequency of the reference resonator 16 and the high-frequency signal amplitude-modified by the signal having the resonance frequency of the pressure resonator 14, which are effected in this manner. The controller determines the difference between the frequency of the signal having the resonance frequency retrieved from the former high-frequency signal (hereinafter sometimes referred to as a "reference measurement frequency") and the frequency of the signal having the resonance frequency retrieved from the latter high-frequency signal (hereinafter sometimes referred to as a "pressure measurement frequency"). Thus, the controller measures the tire pressure. A correlation data table among the reference measurement frequency, the pressure measurement frequency, and a tire pressure is generated in advance, and the tire pressure is computed using this correlation data table.

Figure 2:
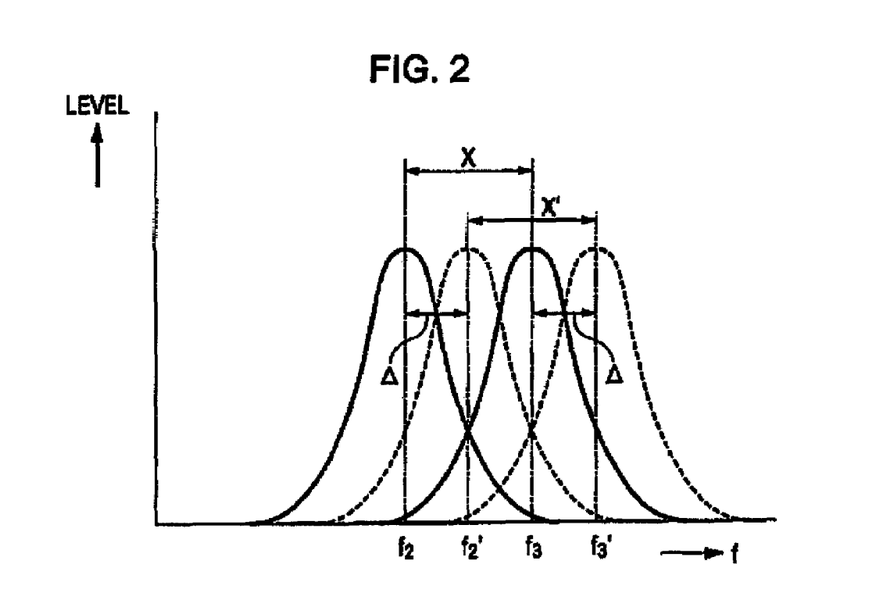
FIG. 2 is a diagram illustrating change of the difference between the resonance frequency of a reference resonator and the resonance frequency of a pressure resonator in the transponder according to one embodiment.
Figure 3:
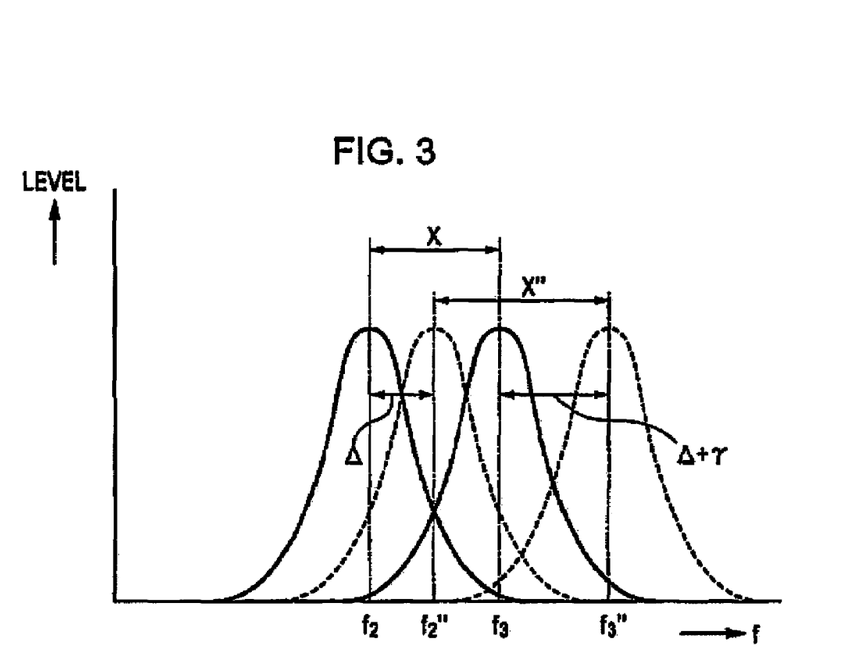
FIG. 3 is a diagram illustrating change of the difference between the resonance frequency of a reference resonator and the resonance frequency of a pressure resonator in the transponder according to one embodiment.
Figure 4:
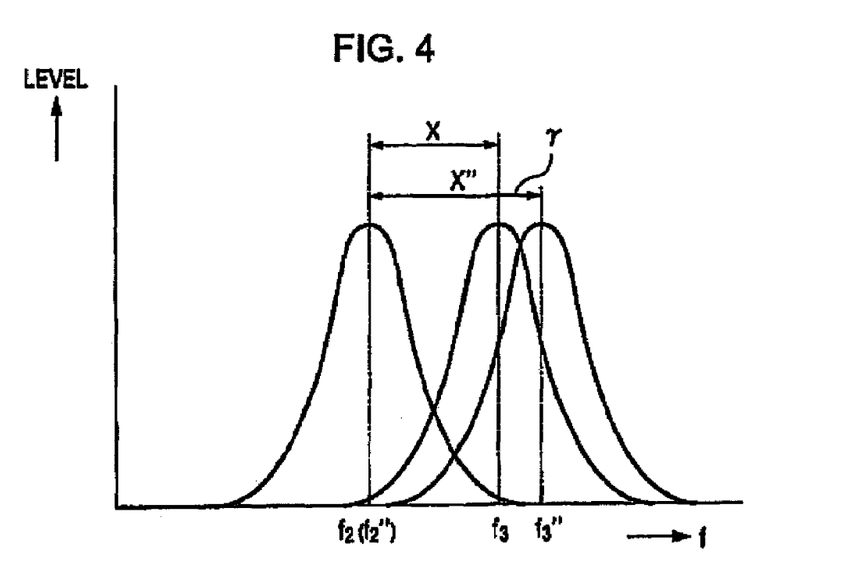
FIG. 4 is a diagram illustrating the relationship the tire pressure and a change in the difference between the resonance frequency of a reference resonator and the resonance frequency of a pressure resonator in the transponder according to one embodiment.

FIG. 2 to FIG. 4 are diagrams illustrating the difference between the reference measurement frequency and the pressure measurement frequency to compute the tire pressure. The tire pressure can be detected by measuring a frequency difference between the reference measurement frequency and the pressure measurement frequency. For example, the tire pressure can be detected by computing the frequency difference between the pressure measurement frequency that is detected by the pressure sensor 19 and affected by a change in pressure and the reference measurement frequency that is little affected by the change in pressure.

Note that both the reference resonator 16 and the pressure resonator 14 are affected by the factor of the temperature of the tire. For example, when the temperature of the tire is changed, the center frequencies of the reference measurement frequency f2 and the pressure measurement frequency f3 are deviated by substantially the same frequency width Δ, as illustrated by a dotted curve in FIG. 2 (see a reference measurement frequency f2' and a pressure measurement frequency f3' shown in FIG. 2).

In one embodiment, the characteristics of the quartz crystal resonating element 17 used for the pressure resonator 14 closely resemble those of the quartz crystal resonating element 21 used for the reference resonator 16. Therefore, the difference between frequency changes caused by the change in temperature is significantly small. The frequency difference X between the reference measurement frequency f2 and the pressure measurement frequency f3 is substantially the same as the frequency difference X' between the reference measurement frequency f2' and the pressure measurement frequency f3', and therefore, a measurement difference between the frequency difference X and the frequency difference X' is negligible.

FIG. 3 illustrates a graph when the tire pressure and temperature are changed. The center frequency of the reference measurement frequency f2 is deviated by a width $\Delta$ so that the reference measurement frequency f2 is changed to a reference measurement frequency f2". The center frequency of the pressure measurement frequency f3 is deviated by the width $\Delta$ plus a width $\gamma$ which is the effect of the pressure sensor 19 so that the pressure measurement frequency f3 is changed to a pressure measurement frequency f3".

FIG. 4 illustrates the relationship the tire pressure and a change in a difference between a pressure measurement frequency and the reference measurement frequency. FIG. 4 indicates that, in any state, the frequency difference between the frequency difference X and the frequency difference X" is effected only by the pressure. Therefore, the tire pressure can be obtained by using a formula or a correlation data table between this value and the tire pressure obtained through experiments in advance.

In the foregoing description, the tire pressure has been computed from a frequency difference, the tire pressure can be computed by measuring the temperature using the reference measurement frequency first and, subsequently, using the measured value of the pressure measurement frequency and a correlation data between a temperature and a pressure measurement frequency. For example, regardless of whether computed directly or indirectly, the tire pressure can be computed from the reference measurement frequency and the pressure measurement frequency.

In the tire information detecting system according to the present embodiment, to measure the tire pressure in this manner, the self-resonance frequency of the quartz crystal resonating element 17 of the pressure resonator 14 is substantially the same as that of the quartz crystal resonating element 21 of the reference resonator 16. However, the present invention is not limited thereto. When the resonance frequencies of the pressure resonator 14 and the reference resonator 16 are set to the above-described frequencies, the self-resonance frequency of the quartz crystal resonating element 17 is not necessarily substantially the same as that of the quartz crystal resonating element 21, and therefore, any method may be employed.

Additionally, in the tire information detecting system according to the present embodiment, to measure the tire pressure in this manner, the characteristics of the quartz crystal resonating element 17 in the pressure resonator 14 closely resemble those of the reference resonator 16 in the quartz crystal resonating element 21. Since the pressure resonator 14 and the reference resonator 16 are disposed in the same tire, these two resonators are affected by the environmental change, such as a temperature change, in the tire at the same time. In such a case, if the characteristics of the two quartz crystal resonating elements in the two resonators are different and the two quartz crystal resonating elements are affected by the same environmental change, the changes in the resonance frequencies of the pressure resonator 14 and the reference resonator 16 are different. As a result, an error occurs in computation of the tire pressure.

The temperature characteristic is the most important among these characteristics. This is because, in general, quartz crystal resonating elements are sensitive to a temperature and a significant temperature change occurs in a tire. The main reason for providing the reference resonator 16 is to correct the effect of temperature received by the pressure resonator 14. However, in this case, if the temperature characteristics of the quartz crystal resonating elements of the pressure resonator 14 and the reference resonator 16 are different, an error occurs in this correction. Therefore, the temperature characteristics are important. The time degradation characteristic needs to be taken into account to prevent an error caused by time degradation.

According to the present embodiment, the quartz crystal resonating elements 17 and 21 of the transponder 10 are manufactured under substantially the same condition so that the characteristics of the quartz crystal resonating element 17 are made to be close to those of the quartz crystal resonating element 21. The widely used manufacturing steps of a quartz crystal resonating element are briefly described below. Subsequently, the manufacturing condition required for the quartz crystal resonating elements used for the transponder 10 according to the present embodiment is described.

In one embodiment, a method for manufacturing a quartz crystal resonating element includes a surface grinding (Lambert processing) step for clarifying the X, Y, and Z axes of an artificial quartz crystal, a wafer cutting step for mechanically cutting the artificial quartz crystal at a predetermined angle into wafers after the Lambert processing step is completed, a first cutting and shaping step for cutting and processing the artificial crystal into a processed wafer after the wafer cutting step is completed, a thickness-adjustment polishing and frequency-adjustment polishing step for determining the frequency of the quartz piece, a second cutting and shaping step for cutting and processing the wafer into a shape determined by the design values, a bevel processing step for grinding the edge so that the oscillation is concentrated on the center of the quartz piece, an etching and cleaning step for chemically removing a processing layer generated by the polishing and increasing the accuracy of the frequency, a vapor-deposition and assembling step for vapor-depositing an electrode on the quartz piece and fixing the electrode to a holder by means of a conductive adhesive agent, a frequency-adjustment and sealing step for adjusting the thickness of the electrode while oscillating the quartz crystal so as to adjust the frequency again, and a product inspecting step for inspecting the airtightness, electrical insulation properties, frequency characteristics, and the impedance.

In one embodiment, for example, in the second cutting and shaping step, the quartz crystal is cut into a quartz piece having a size for two quartz pieces finally used for the two quartz crystal resonating elements. After the bevel processing step and the etching and cleaning step are completed, two electrodes are vapor-deposited on the quartz piece in the vapor-deposition and assembling step. In a third cutting and shaping step, the quartz piece is cut into two quartz pieces and the two quartz pieces are fixed to a holder by a conductive adhesive agent. As described above, since the two quartz pieces used for the two quartz crystal resonating elements are coupled with each other and are produced through the same manufacturing steps until the third cutting and shaping step is performed, the characteristics of materials for the quartz crystal resonating elements can be substantially the same. Note that the number of the holders to which the quartz pieces are fixed may be two or one.

The quartz pieces used for the quartz crystal resonating elements 17 and 21 are produced from one quartz piece on a single wafer. As can be seen from a relationship between the manufacturing steps and the characteristics, in addition to producing two quartz crystal resonating elements from one quartz piece, a quartz crystal resonating element may be produced from each of two adjacent quartz pieces on a single wafer. Thereafter, these two quartz crystal resonating elements may be used as the quartz crystal resonating element 17 of the pressure resonator 14 and the quartz crystal resonating element 21 of the reference resonator 16. In addition, although the performance slightly deteriorates, two quartz crystal resonating elements using quartz pieces produced from a single wafer can be employed.

While the quartz crystal resonating elements 17 and 21 formed from a quartz crystal have been used as piezoelectric single-crystal resonating elements disposed in the pressure resonator 14 and the reference resonator 16, the piezoelectric single-crystal resonating elements are not limited to quartz crystal resonating elements. For example, a resonating element may be obtained by processing a piezoelectric single-crystal lithium tantalite ($LiTaO_3$), a piezoelectric single-crystal niobium tantalate ($LiNbO_3$), a piezoelectric single-crystal lithium borate ($Li_2B_4O_7$), a piezoelectric single-crystal potassium niobate ($KNbO_3$), a piezoelectric single-crystal langasite ($La_3Ga_5SiO_{14}$), a piezoelectric single-crystal langanite ($La_3Nb_{0.5}Ga_{5.5}O_{14}$), or a lead zinc niobate titanate single crystal. Like the quartz crystal resonating element, a plurality of these resonating elements can be produced from a wafer.

In the manufacturing steps, two resonating elements having similar characteristics can be obtained on the same quartz piece. Therefore, these two resonating elements can be used as piezoelectric single-crystal resonating elements. To obtain similar characteristics in the manufacturing steps, the method used for the quartz crystal resonating element can be also used. However, the method is modified in accordance with the material. Since the quartz crystal resonating element has a high Q compared with the other piezoelectric single-crystal resonating elements, the response frequency is stable, and therefore, the measured values are stable. Accordingly, the quartz crystal resonating element is suitable for providing a high-precision tire information detecting system.

In one embodiment, the transponder 10 includes the pressure resonator 14 that changes the resonance frequency thereof in accordance with a tire pressure and the reference resonator 16 having the resonance frequency thereof that is not affected by a change in the tire pressure. The controller computes a measured value on the basis of the resonance frequencies of the pressure resonator 14 and the reference resonator 16 retrieved from resonance frequency signals of the pressure resonator 14 and the reference resonator 16. For example, even when the temperature of the tire is changed, the measured value can be computed on the basis of the resonance frequencies of the two resonators effected by the change in the tire temperature. Thus, the effect of a factor, such as the tire temperature, can be reduced, and therefore, the measured value, such as a tire pressure, can be accurately detected.

In one embodiment, the characteristics of the piezoelectric single-crystal resonating element (quartz crystal resonating element) 17 are made to be close to those of the piezoelectric single-crystal resonating element (quartz crystal resonating element) 21 through a specific manufacturing method. By making the characteristics of the piezoelectric single-crystal resonating elements (quartz crystal resonating elements) 17 and 21 close to each other, the effect of a change in a tire temperature is equally applied to the resonance frequencies of the two resonators. By computing the measured value in accordance with the frequency difference between the resonance frequencies of the pressure resonator and the reference resonator, the affect of a factor, such as a tire temperature, can be reduced, and therefore, the measured value, such as a tire pressure, can be further accurately detected.

It should be noted that the present invention is not limited to the above-described embodiments. On the contrary, various modifications can be made to the above-described embodiments. In the above-described embodiments, the sizes and shapes of the components shown in the attached drawings are not limited thereto. For example, the scales can be altered within the spirit and scope of the inventive concepts described as needed. In addition, various changes may be made within the spirit and scope of the present invention.

For example, while the present embodiment has been described with reference to the transponder 10 including the pressure resonator 14 and the reference resonator 16 and detecting a tire pressure by measuring measurement frequencies in accordance with the resonance frequencies of the two resonators, the configuration of the transponder 10 is not limited thereto. The transponder 10 may include a new component.

Figure 5:
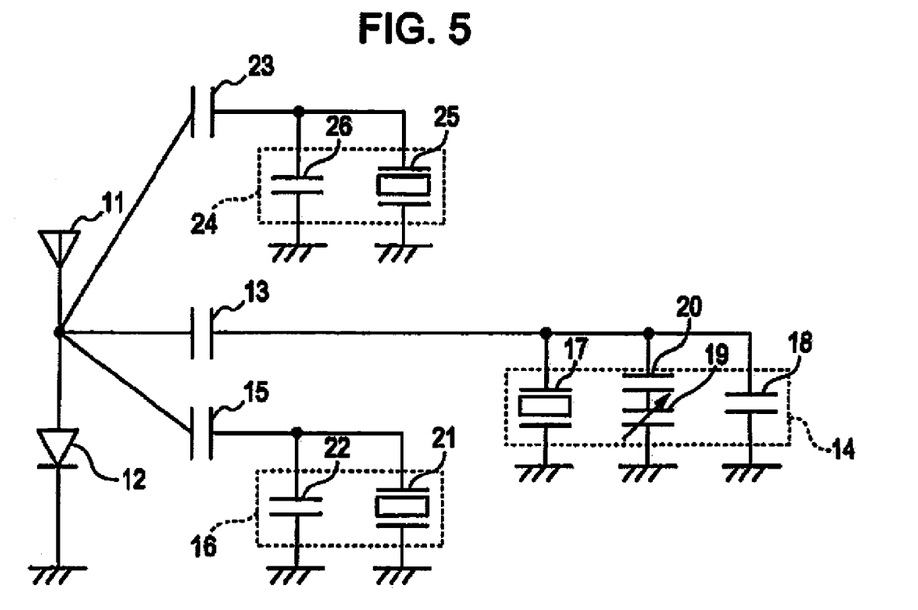
FIG. 5 illustrates a modification of the circuit configuration of the transponder according to one embodiment.

For example, as shown in FIG. 5, a temperature resonator 24 may be connected to the antenna 11 via a coupling capacitor 23. In such a case, like the other resonator, the temperature resonator 24 is composed of a resonator including a quartz crystal resonating element. The temperature resonator 24 includes a quartz crystal resonating element 25 for measuring a temperature and a capacitor 26 forming a load capacitance for determining the resonance frequency of the temperature resonator 24. Similar numbering will be used in describing FIG. 5 as was utilized above in describing FIG. 1 and the descriptions are not repeated.

When adding the temperature resonator 24, it is desirable that the characteristics of the quartz crystal resonating element 17 of the pressure resonator 14 closely resemble those of the quartz crystal resonating element 21 of the reference resonator 16. In addition, it is desirable that the characteristics of the quartz crystal resonating element 25 of the temperature resonator 24 are somewhat different from those of the quartz crystal resonating element 17 and the quartz crystal resonating element 21. Since the characteristics of the quartz crystal resonating element 17 of the pressure resonator 14 closely resemble those of the quartz crystal resonating element 21 of the reference resonator 16, the tire pressure can be accurately detected even when the tire temperature changes. In addition, the tire temperature can be reliably detected without being affected by the resonance of the pressure resonator 14.

While the present embodiment has been described with reference to the transponder 10 including the pressure resonator 14 having the quartz crystal resonating element 17 and the reference resonator 16 having the quartz crystal resonating element 21, the present invention is not limited thereto. The other piezoelectric single-crystal resonating elements can be used in place of the quartz crystal resonating element 17 and the quartz crystal resonating element 21. Even in such a case, the same advantage as that of the above-described embodiment can be provided.

Furthermore, while the present embodiment has been described with reference to the controller in which amplitude modification of the carrier waves f1 by the oscillation signal of 9.800 MHz is temporally shifted from that by the resonance signal of 9.803 MHz, the timing of the amplitude modification can be appropriately changed. For example, the amplitude modification of the carrier waves f1 by the oscillation signal of 9.800 MHz may be performed at the same time as that by the oscillation signal of 9.803 MHz. Even in such a case, the same advantage as that of the above-described embodiment can be provided.

What is claimed is:

1. A tire information detecting system comprising:
a measured value transmitter disposed in a tire of a vehicle; and
a controller disposed in the body of the vehicle;
wherein the measured value transmitter includes:
an antenna,
a modulating/demodulating unit that is connected to the antenna and that is operative to modulate and demodulate signals received and transmitted from and to the controller,
first and second coupling capacitors connected to the antenna,
a first resonator connected to the first coupling capacitor, the first resonator including a first piezoelectric single-crystal resonating element and a pressure sensor, and
a second resonator connected to the second coupling capacitor, the second resonator including a second piezoelectric single-crystal resonating element and a capacitor, and
wherein the controller is operative to transmit a signal that resonates the first and second resonators, receive a signal having the resonance frequency of the first resonator and a signal having the resonance frequency of the second resonator, compute a measured value in accordance with the resonance frequencies of the first and second resonators retrieved from the received signals, or any combination thereof.

2. The tire information detecting system according to claim 1, wherein the characteristics of the first piezoelectric single-crystal resonating element closely resemble the characteristics of the second piezoelectric single-crystal resonating element.

3. The tire information detecting system according to claim 2, wherein the first piezoelectric single-crystal resonating element is a first quartz crystal resonating element and the second piezoelectric single-crystal resonating element is a second quartz crystal resonating element.

4. The tire information detecting system according to claim 3, wherein quartz pieces used for the first quartz crystal resonating element and the second quartz crystal resonating element are manufactured from a single wafer.

5. The tire information detecting system according to claim 1, wherein the measured value transmitter further includes a third resonator including a third piezoelectric single-crystal resonating element and a capacitor, the resonance frequency of the third resonator changes in accordance with a change in temperature of the tire.

6. The tire information detecting system according to claim 5, wherein the characteristics of the first piezoelectric single-crystal resonating element closely resemble the characteristics of the second piezoelectric single-crystal resonating element, and the characteristics of the third piezoelectric single-crystal resonating element are different from the characteristics of the first piezoelectric single-crystal resonating element and the second piezoelectric single-crystal resonating element.

7. A method for manufacturing a quartz crystal resonating element, the method including:
clarifying the X, Y, and Z axes of an artificial quartz crystal,
mechanically cutting the artificial quartz crystal at a predetermined angle into wafers,
cutting and processing the artificial crystal into a processed wafer,
determining the frequency of the quartz piece,
cutting and processing the wafer into a shape determined by the design values,
grinding the edge so that the oscillation is concentrated on the center of the quartz piece,
chemically removing a processing layer generated by the polishing and increasing the accuracy of the frequency,
vapor-depositing an electrode on the quartz piece and fixing the electrode to a holder by a conductive adhesive agent, and
adjusting the thickness of the electrode while oscillating the quartz crystal so as to adjust the frequency again.

8. The method for manufacturing the quartz crystal resonating element according to claim 7, further comprising inspecting the airtightness, electrical insulation properties, frequency characteristics, and the impedance.

9. The method for manufacturing the quartz crystal resonating element according to claim 7, wherein in the second cutting and shaping step, the quartz crystal is cut into a quartz piece having a size for two quartz pieces finally used for the two quartz crystal resonating elements.

10. The method for manufacturing the quartz crystal resonating element according to claim 7, wherein two electrodes are vapor-deposited on the quartz piece when vapor-depositing an electrode on the quartz piece.

11. The method for manufacturing the quartz crystal resonating element according to claim 7, wherein in a third cutting and shaping step, the quartz piece is cut into two quartz pieces and the two quartz pieces are fixed to a holder by a conductive adhesive agent.

12. The method for manufacturing the quartz crystal resonating element according to claim 7, wherein two quartz pieces used for the two quartz crystal resonating elements are coupled with each other and are produced through the same manufacturing steps until the third cutting and shaping step is performed.

13. The method for manufacturing the quartz crystal resonating element according to claim 7, wherein the characteristics of materials for the quartz crystal resonating elements are substantially the same.

14. The method for manufacturing the quartz crystal resonating element according to claim 7, wherein the number of the holders to which the quartz pieces are fixed is at least one.

15. A measured value transmitter used in a tire information detecting system including:
an antenna,
a modulating/demodulating unit that is connected to the antenna and that is operative to modulate and demodulate signals received and transmitted from and to a controller,
first and second coupling capacitors connected to the antenna,
a first resonator connected to the first coupling capacitor, the first resonator including a first piezoelectric single-crystal resonating element and a pressure sensor, and
a second resonator connected to the second coupling capacitor, the second resonator including a second piezoelectric single-crystal resonating element and a capacitor.

* * * * *